(12) United States Patent
Braun et al.

(10) Patent No.: US 8,819,670 B2
(45) Date of Patent: Aug. 26, 2014

(54) AUTOMATED SOFTWARE INSTALLATION WITH INTERVIEW

(75) Inventors: Matthew R. Braun, Northville, MI (US); Edmund J. Gurney, III, Canton, MI (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1183 days.

(21) Appl. No.: 12/751,149

(22) Filed: Mar. 31, 2010

(65) Prior Publication Data

US 2011/0246981 A1    Oct. 6, 2011

(51) Int. Cl.
*G06F 9/445*    (2006.01)

(52) U.S. Cl.
USPC ........................................................ 717/174

(58) Field of Classification Search
CPC ...... G06F 8/63; G06F 9/4416; G06F 9/44505; G06F 11/2056; G06F 11/2058; G06F 17/30067; G06F 8/61; G06F 11/1666; G06F 3/065
USPC ........................................................ 717/174
See application file for complete search history.

(56) References Cited

U.S. PATENT DOCUMENTS

| | | | |
|---|---|---|---|
| 5,644,696 A * | 7/1997 | Pearson et al. | 714/6.3 |
| 6,066,182 A * | 5/2000 | Wilde et al. | 717/175 |
| 7,603,443 B2 * | 10/2009 | Fong et al. | 709/220 |
| 8,423,732 B1 * | 4/2013 | Rajan | 711/162 |
| 2004/0019822 A1 * | 1/2004 | Knapp, III | 714/6 |
| 2007/0022265 A1 * | 1/2007 | Nishikawa et al. | 711/162 |
| 2007/0088768 A1 * | 4/2007 | Passerini et al. | 707/203 |
| 2008/0059556 A1 * | 3/2008 | Greenspan et al. | 709/201 |
| 2008/0209413 A1 * | 8/2008 | Kakumani et al. | 717/172 |
| 2010/0050169 A1 * | 2/2010 | Dehaan | 717/178 |

OTHER PUBLICATIONS

Rangelrooij et al. "Debian User Reference Manual: Chapter 4—Files and File Systems" version 0.1, Dec. 29, 2009 19 pages.*

Nexenta Syatems Inc. "NexentaStor User Guide version 3.0—5 Managing Data Volumes" Copyright 2010 Nexenta Systems, Inc. 2 pages.*

* cited by examiner

*Primary Examiner* — Li B Zhen
*Assistant Examiner* — Hui-Wen Lin

(57) ABSTRACT

A computing device prompts a user to supply installation parameters for joint installation of an operating system and core software on a server device, and stores, in a memory, the installation parameters received from the user. The computing device provides, to the server device, instructions to install an image of the operating system directly to volumes for the core software, where the instructions require input of installation parameters during the installation. The computing device also receives, from the server device and during the operating system installation, requests for the installation parameters. The computing device sends, to the server device, the stored installation parameters that are responsive to the requests for the installation parameters.

24 Claims, 13 Drawing Sheets

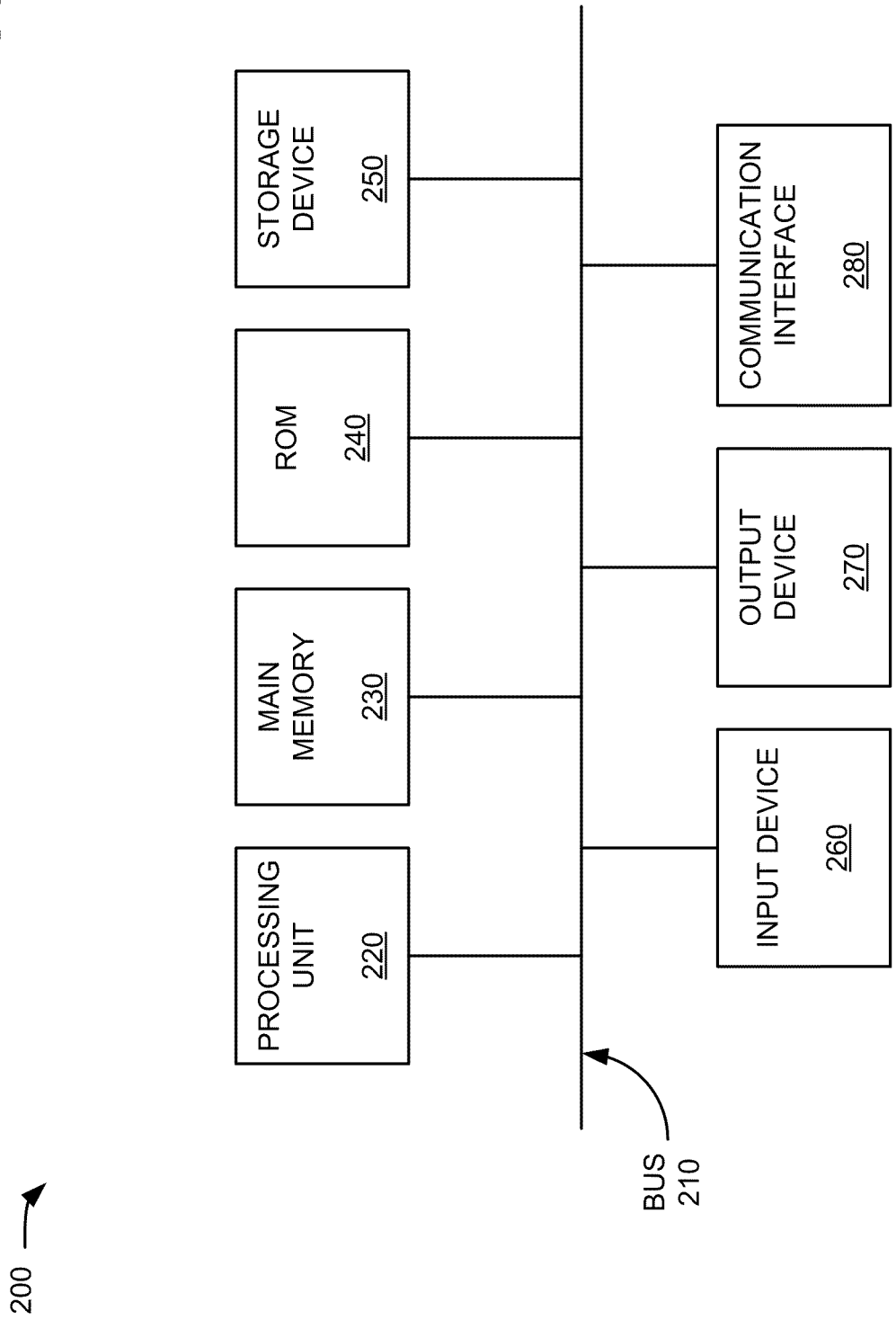

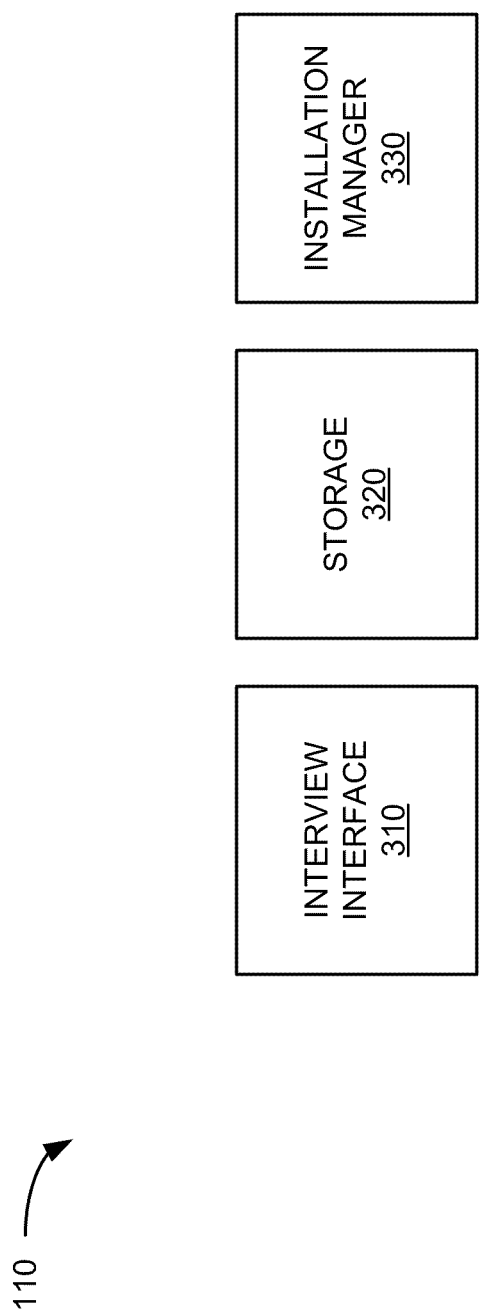

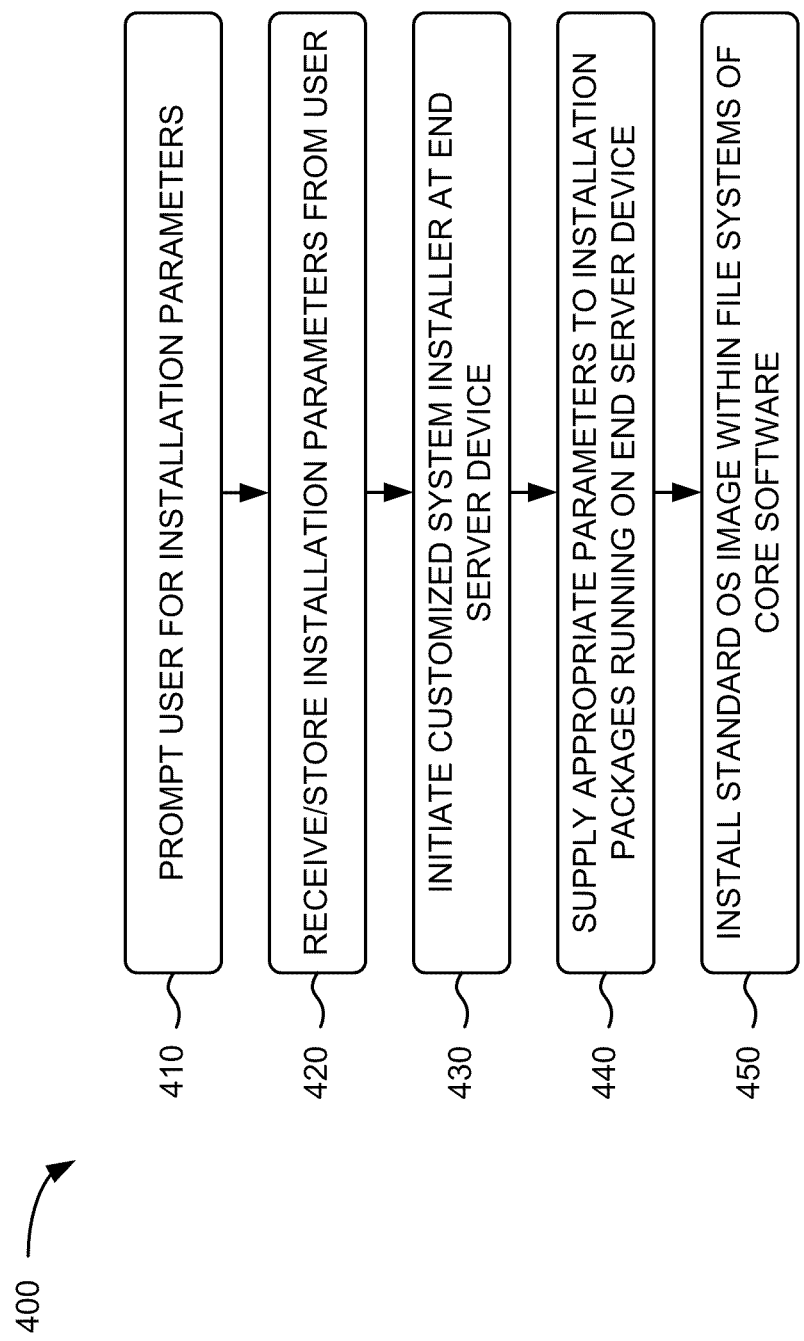

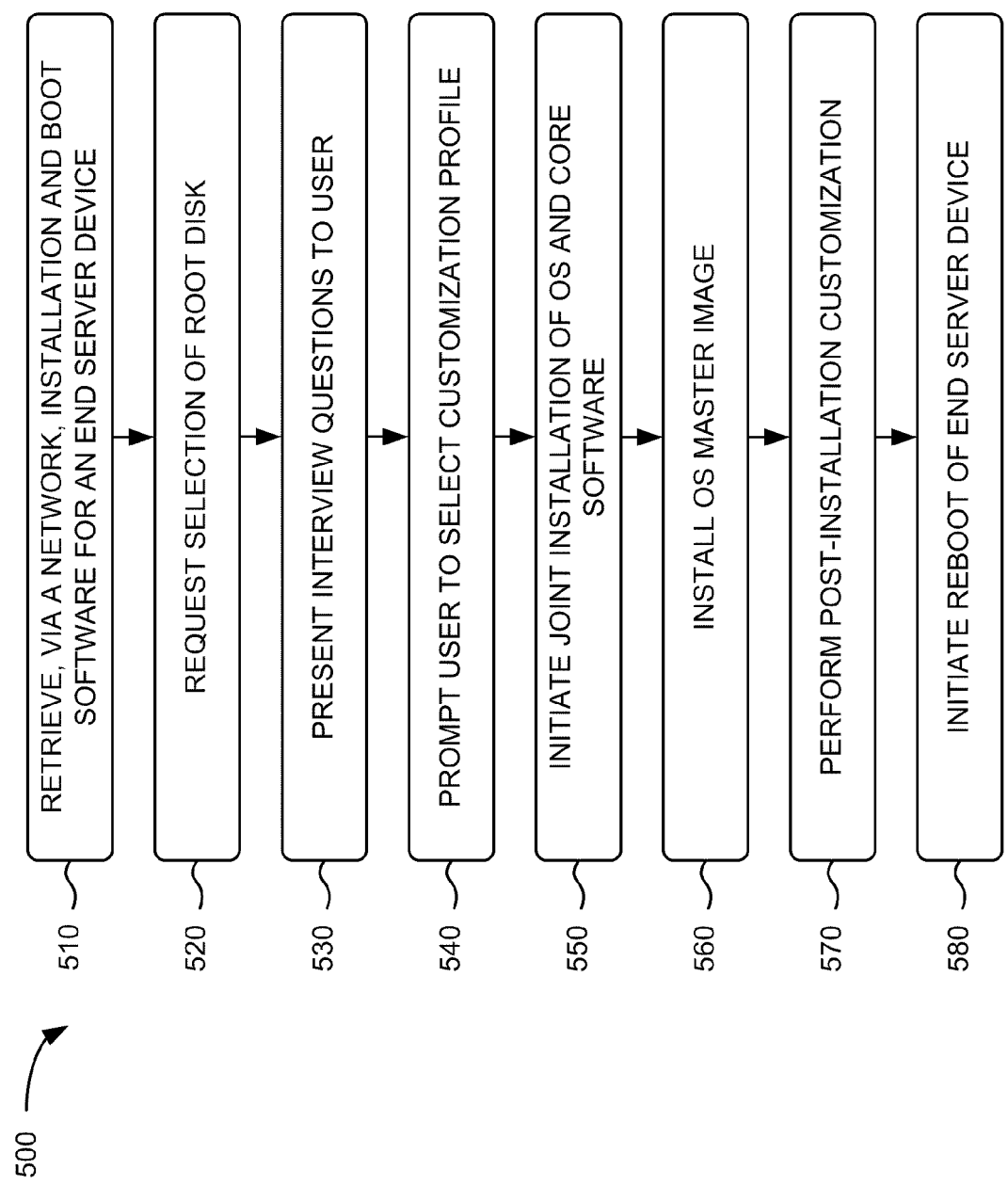

FIG. 6A

```
{8} ok boot net - install

SC Alert: Host System has Reset

Sun Fire T200, No Keyboard
Copyright 2008 Sun Microsystems, Inc.  All rights reserved.
OpenBoot 4.28.9, 8064 MB memory available, Serial #80457254.
Ethernet address 0:14:4f:cb:ae:26, Host ID: 84cbae26.

Boot device: /pci@780/pci@0/pci@1/network@0  File and args: - install

1000 Mbps full duplex  Link up
<time unavailable> wanboot info: WAN boot messages->console
<time unavailable> wanboot progress: wanbootfs: Read 368 of 368 kB (100%)
<time unavailable> wanboot info: wanbootfs: Download complete
Thu Jun 11 16:25:21 wanboot progress: miniroot: Read 287728 of 287728 kB (100%)
Thu Jun 11 16:25:21 wanboot info: miniroot: Download complete
SunOS Release 5.10 Version Generic_138888-05 64-bit Configuring devices.
Network interface was configured manually.
Beginning system identification...
```

IMAGE INSTALLATION  10u6.10q2.0

Gathering disk information...
done

Select the installation disks:

c0:
   0.   c0t0d0   136.71GB   SUN146G  @780/@0/@9/scsi@0/sd@0
   1.   c0t1d0   136.71GB   SUN146G  @780/@0/@9/scsi@0/sd@1
   2.   c0t2d0   136.71GB   SUN146G  @780/@0/@9/scsi@0/sd@2
   3.   c0t3d0   136.71GB   SUN146G  @780/@0/@9/scsi@0/sd@3
c2:
   4.   c2t8d0   68.35GB    SUN72G   @7c0/@0/@1/@0,2/scsi@1/sd@8   rootdg
   5.   c2t9d0   68.35GB    SUN72G   @7c0/@0/@1/@0,2/scsi@1/sd@9   rootdg Enter one or more disks, separated by spaces.
Use '/' to separate the root (and optional mirror) disk from the altboot disks.
Disk order is: root [mirror] [/ altboot1 [altboot2]]
Select disks or enter 'q' to quit [0-5 / q]: 0 4 / 1 5
```

FIG. 6C

```
Installation interview for rsipdcsta02.corpbi.com
(enter '?' for help on an entry, or 'q' to exit the interview)

Enter your CorpID for the install records: P23520
Enter your e-mail address: first.last@corp.com
Veritas license key [XXXX-XXXX-XXXX-XXXX-UCP3-XCC3-CRJP]:
System serial number: XXXXBD175C
Data center and bay location: PDC DASD #2 Bay 33.40
Console access command: telnet pdcta6.corpbi.com 2201
DNS search path [corpbi.com]:
Name server IP addresses [10.37.130.87 10.37.162.103]:
NTP server IP addresses [10.37.187.1 10.122.43.139]:
Will this be production-monitored by Patrol? (yes/no) [no]:
Backup/SAN strategy: 0=none, 1=NetBackup, 2=NetApp SAN storage [1]:
ECC server [ecc-pdc.corpbi.com]:
Use fully-qualified hostname? (yes/no) [yes]:
```

FIG. 6D

```
Available installs for the selected disks and this system type:

1. OS image (without middleware), 50+ GB drive, mirrored
2. OS image with Corp Telecom packages, 50+ GB drive, mirrored
3. OS image with Corp Business packages, 50+ GB drive, mirrored
4. minimal image (internal testing only), 50+ GB drive, mirrored

[SEI] Enter command or choose an install: 3

Confirm settings for rsipdcsta02.corpbi.com:

Installer CorpID: P23520
Installer e-mail: first.last@corp.com
     Veritas key: XXXX-XXXX-XXXX-XXXX-UCP3-XCC3-CRJP
   Serial number: XXXXBD175C
        Location: PDC DASD #2 Bay 33.40
         Console: telnet pdcta6.corpbi.com 2201
 DNS search path: corpbi.com
    Name servers: 10.37.130.87 10.37.162.103
     NTP servers: 10.37.187.1 10.122.43.139

Type: OS image with Corp Business packages, 50+ GB drive, mirrored

Begin system installation using this configuration? (yes/no) [yes]
```

FIG. 6E

```
Volume management mode is 'vx'
Configuring Veritas....
    - Setting up swapvol
    - Setting up apps
    - Setting up home
    - Setting up rootvol
Finalizing Veritas configuration Begin script begin_script execution completed.
Searching for SolStart directory....
Checking rules.ok file....
Using begin script: install_begin
Using finish script: patch_finish
Executing SolStart preinstall phase...
Executing begin script "install_begin"....
Begin script install_begin execution completed.

Processing profile
    - Opening Flash archive
    - Validating Flash archive
    - Selecting all disks
    - Configuring boot device
    - Configuring swap (c2t8d0s1)
```

640

FIG. 6F

```
Extracting archive: OS image 10u6.10q2.0 built 2010/03/11
    Extracted    0.00 MB (   0% of 4452.87 MB archive)
    Extracted    1.05 MB (   0% of 4452.87 MB archive)
    Extracted    2.05 MB (   0% of 4452.87 MB archive)
    Extracted    3.05 MB (   0% of 4452.87 MB archive)
    Extracted    4.05 MB (   0% of 4452.87 MB archive)
    Extracted    5.05 MB (   0% of 4452.87 MB archive)
    Extracted    6.05 MB (   0% of 4452.87 MB archive)
    Extracted    7.05 MB (   0% of 4452.87 MB archive)
    Extracted    8.05 MB (   0% of 4452.87 MB archive)
time passes...
    Extracted 4723.35 MB (  99% of 4452.87 MB archive)
    Extracted 4723.42 MB (  99% of 4452.87 MB archive)
    Extracted 4723.42 MB ( 100% of 4452.87 MB archive)
    Extracted 4723.42 MB ( 100% of 4452.87 MB archive)
Extraction complete
```

```
Starting OS image post-install
* Processing cluster sei-corpb-flash
1/23: Changing name service type to 'dns'
2/23: Installing package 'SEIversion'...
3/23: Installing package 'SEIbase'...
4/23: Installing package 'SEIshconf'...
5/23: Installing package 'SEIcoreimg'...
6/23: Selecting /usr/bin/zsh for root's shell
7/23: Installing package 'SEIcorpcustom'....
8/23: Updating SSI files
9/23: Installing package 'SEIkerberos'....
10/23: Installing package 'SEIsudo'...
11/23: Installing package 'Corpesm'....
12/23: Installing package 'Corpai'...
13/23: Queueing non-JumpStart compliant Corpdirssi for installation after boot
14/23: Queueing non-JumpStart compliant Corpfixlog for installation after boot
15/23: Queueing non-JumpStart compliant Corpadvise for installation after boot
16/23: Queueing non-JumpStart compliant CrpSdnscfg for installation after boot
17/23: Queueing non-JumpStart compliant CrpSntpcfg for installation after boot
```

```
syncing file systems... done
rebooting...

SC Alert: Host System has Reset
ChassisLocation PDC DASD #2 Bay 33.40
ChassisConsole telnet pdcta6.corpbi.com 2201
ChassisSerialNumber XXXXBD175C Sun Fire T200, No Keyboard
Copyright 2008 Sun Microsystems, Inc.  All rights reserved.
OpenBoot 4.28.9, 8064 MB memory available, Serial #80457254.
Ethernet address 0:14:4f:cb:ae:26, Host ID: 84cbae26.

Boot device: /pci@780/pci@0/pci@9/scsi@0/disk@0,0:a  File and args:
SunOS Release 5.10 Version Generic_138888-02 64-bit
Copyright 1983-2008 Sun Microsystems, Inc.  All rights reserved.
Use is subject to license terms.

Hostname: rsipdcsta02.corpbi.com
Configuring devices.
/dev/rdsk/c0t0d0s6 is clean
/dev/rdsk/c0t0d0s5 is clean
Reading ZFS config: done.
Creating new rsa public/private host key pair
Creating new dsa public/private host key pair rsipdcsta02.corpbi.com console login:
```

AUTOMATED SOFTWARE INSTALLATION WITH INTERVIEW

BACKGROUND

The labor-intensive tasks required to maintain all aspects of an operating system (such as the Solaris Operating System) networked devices presents inherit risks to system availability. Each phase of the installation/build and maintenance processes require manual activities that are prone to process errors and operator imprecision. In certain environments, it is also important that each server running the operating system is built with an identical file structure, to ensure compatibility and to comply with, for example, a corporation's infrastructure standards. Also, encompassed within the need to improve these installation/build and maintenance processes are goals to increase speed-of-delivery and reduce mean-time-to-repair.

BRIEF DESCRIPTION OF THE DRAWINGS

FIG. 2 is a diagram of exemplary components of one of the devices depicted in FIG. 1;

FIG. 3 is a diagram of exemplary functional components of an interview server depicted in FIG. 1;

FIG. 4 is a flow chart of an exemplary process for performing an automated software installation according to implementations described herein;

FIG. 5 is a flow chart of another exemplary process for performing an automated software installation according to implementations described herein; and FIGS. 6A-6H are diagrams of exemplary user interfaces capable of being generated by a client device during an automated software installation.

DETAILED DESCRIPTION OF PREFERRED EMBODIMENTS

Figure 1:
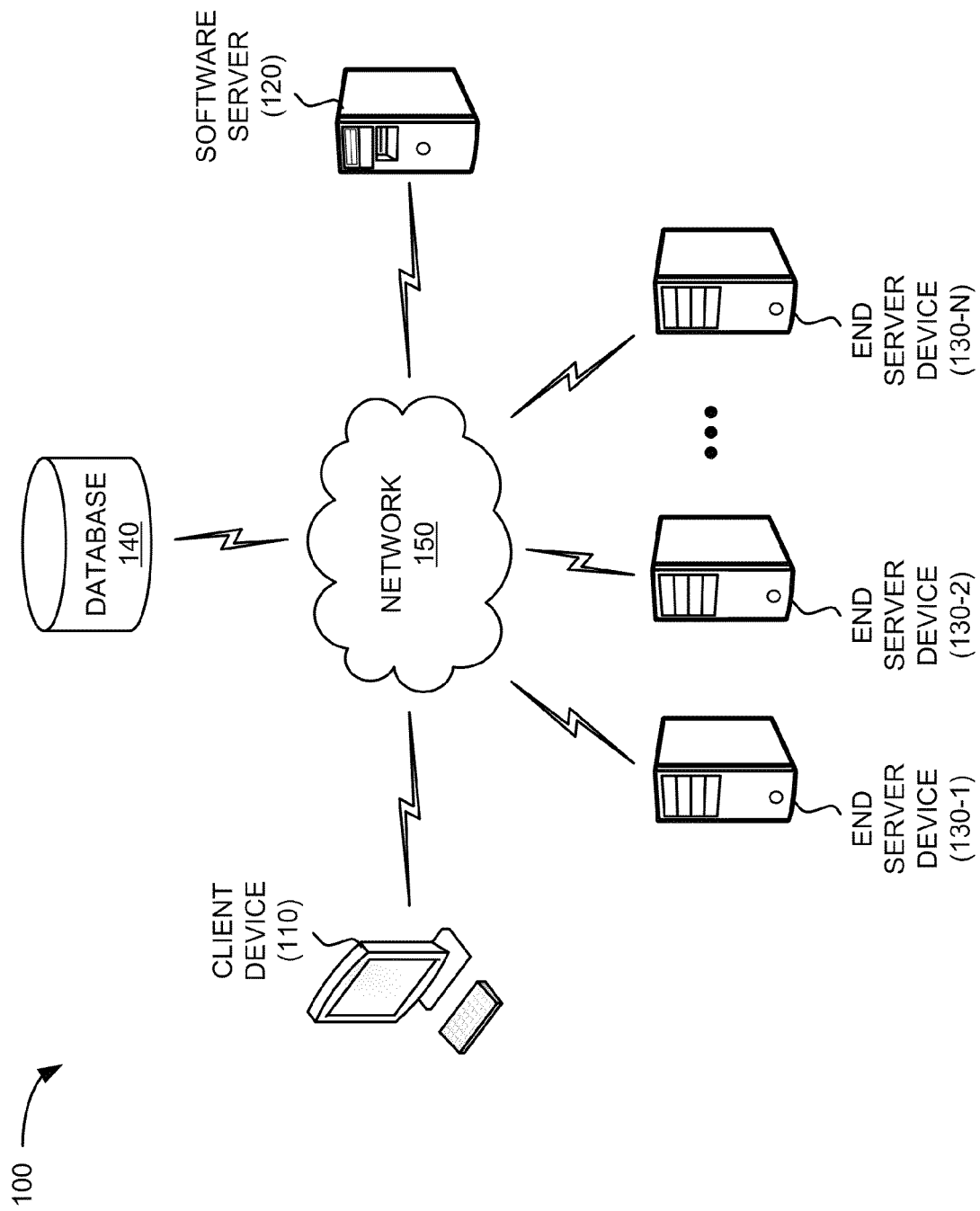
FIG. 1 is a diagram of an exemplary network in which systems and/or methods described herein may be implemented.

The following detailed description refers to the accompanying drawings. The same reference numbers in different drawings may identify the same or similar elements. Also, the following detailed description does not limit the invention.

Systems and/or methods described herein may provide an automated operating system (OS) image installer to install base OS software and additional core software (e.g., file system management software) as a single integrated process. The automated OS image installer may be implemented, for example, as a collection of UNIX shell and Perl scripts. The automated OS image installer may provide a user (e.g., a system administrator) with a menu-driven program that collects server information required for installing an OS or another software upgrade. Once the necessary fields of data are entered by the user, the automated OS image installer may initiate the OS installation sequence. The automated OS image installer may utilize native installation routines and other functions that are provided by software vendors (e.g., Sun, Symantec, etc.) to, for example, cause files for the operating system to be installed directly to volumes defined by the core software.

The menu-driven features of the automated OS image installer may allow the user to input all required data elements at the beginning of the OS installation process. Using these elements, the automated OS image installer can return control to the vendor processes and feed the appropriate information when prompted by the vendor software. This program cohabitation (e.g., of the automated OS image installer and vendor processes) may allow for seamless updates, as vendors distribute new versions and releases of software. The automated OS image installer may be configured to automate deployment of a variety of software, including, for example, versions of the UNIX operating system (e.g., the Solaris™ operating system distributed by Sun Microsystems, such as Solaris 10, Update 6 OS), a current quarter Patch Bundle, the Veritas Foundation Suite (distributed by Symantec); critical operations tools (e.g., list open files (lsof), file sync utilities (rsync), etc.); and/or middleware packages required across an enterprise (e.g., EMC control center (ECC), Best1®, PATROL® (both distributed by BMC Software), etc).

FIG. 1 is a diagram of an exemplary network 100 in which systems and/or methods described herein may be implemented. As illustrated, network 100 may include a client device 110, an software server 120, a group of end server devices 130-1, 130-2, . . . , 130-N (where N≥1) (individually referred to as "end server device 130" and collectively referred to as "end server devices 130"), a database 140, and a network 150. Components of network 100 may interconnect via wired connections, wireless connections, or a combination of wired and wireless connections.

A single client device 110, a single software server 120, a group of end server devices 130, a single database 140, and a single network 150 are illustrated in FIG. 1 for simplicity. In practice, there may be additional, fewer, different or differently arranged client devices 110, interview servers 120, end server devices 130, databases 140, and/or networks 150. Also, in some implementations, one or more of the devices of network 100 may perform one or more functions described as being performed by another one or more of the devices of network 100. For example, client device 110, software server 120, end server devices 130, and/or database 140 could be integrated into fewer devices or a single device that performs all or some of the functions described below as being performed by an individual one of these devices. In another example, client device 110 and software server 120 could be integrated into a single device that performs all or some of the functions described below as being performed by an individual one of these devices. Furthermore, as described herein, database 140 may be integrated with client device 110 or software server 120 into a single device that performs all or some of the functions described below as being performed by an individual one of these devices.

Client device 110 may include one or more user devices (e.g., a personal computer, a laptop, a wireless device, such as a mobile phone or a personal digital assistant (PDA), or the like), or other types of computation or communication devices, that gather, process, search, store, and/or provide information in a manner similar to that described herein. Client device 110 may interface with software server 120, end server devices 130, and/or database 140. In one implementation, client device 110 may include logic and/or software associated with an automated OS image installer. For example, client device 110, using the automated OS image installer, may perform operations associated with upgrades for end server device 130, such as operating system updates, patch bundles, operations tools, middleware packages, etc.

Client device 110, using the automated OS image installer, may present a OS installation user interface (UI), on the display of client device 110, corresponding to upgrade operations for end server device 130. Client device 110 may authenticate users and/or development team members logging into the OS installation UI. Client device 110 may receive information from a user, via the UI, when performing upgrade operations for end server device 130. In one implementation, client device 110 may maintain an automated OS image installer database (e.g., database 140) to store information associated with upgrade operations for end server device 130 and may interface with end server device 130 to perform an upgrade operation. In another implementation, client device 110 may provide information received from the user to software server 120.

Software server 120 may include one or more server devices, or other types of computation or communication devices, that gather, process, search, store, and/or provide information in a manner similar to that described herein. Software server 120 may interface with client device 110, end server devices 130, and/or database 140. Software server 120 may provide logic and/or software associated with the automated OS image installer to client device 110. For example, software server 120 may include one or more customized network-bootable disk images that may be used by end server devices 130 to install particular installation profiles. Software server 120 may also include a host operating system and other software files that end server device 130 may retrieve during an OS installation process.

End server device 130 may include one or more server devices, or other types of computation or communication devices, that gather, process, search, store, and/or provide information in a manner similar to that described herein. End server device 130 may interface with client device 110, software server 120, and/or database 140. End server device 130 may also interface with other devices (not shown) to provide a computing infrastructure for internal or external customers of a communications network. For example, end server device 130 may be used to provide a variety of services, such as data storage, application hosting, backup/restore services, monitoring, and other services. End server device 130 may employ any of a number of computer operating systems, including, for example, versions of the UNIX operating system (e.g., the Solaris™ operating system distributed by Sun Microsystems), the AIX UNIX operating system distributed by International Business Machines, the Microsoft Windows® operating system, and the Linux operating system. In some environments, multiple end servers 130 may need identical OS images, regardless of the configuration in hardware components. Generally, end server device 130 may be required to receive OS and/or other software upgrades with minimal errors, man hours, and/or downtime. In implementations described herein, end server devices 130 may receive a customized network-bootable disk image to perform an OS upgrade.

Database 140 may include a device that stores information associated with automated OS image installer operations for one or more end devices 130. Database 140 may store a host operating system, applications and/or data for end server device 130. For example, database 140 may store information input by a user of client device 110 (and transmitted from user device 110/software server 120) in advance of an automated OS installation. Information, associated with a user of client device 110, may be received and stored by database 140 and may be retrieved and sent, along with boot software, to end server device 130 to support upgrade operations for end server device 130.

Network 150 may include a local area network (LAN), a wide area network (WAN), a metropolitan area network (MAN), a telephone network (e.g., the Public Switched Telephone Network (PSTN), or a cellular network, such as the Public Land Mobile Network (PLMN)), an intranet, the Internet, a fiber optic-based network, or a combination of networks.

In implementations described herein, the automated OS image installer may be interwoven with the execution of vendor OS installation processes. The automated OS image installer may integrate the vendor processing, while significantly reducing the duration and error rate within the overall OS installation process. The automated OS image installer may create standard OS images and provide a user (e.g., a system administrator using client device 110) with an interview menu that prompts the user for specific server (e.g., end server device 130) configuration information, such as physical location, backup and recovery methods, etc. With this configuration information stored in memory (e.g., a memory of client device 110, software server 120, or database 140), the automated OS image installer may initiate an OS installation process and automate the intricate transfer of system configuration data to complete a standardized OS build for end server device 130.

The automated OS image installer may integrate installation of multiple vendor tools with the base OS installation. Such vendor tools may include, for example, software tools designed to manage data growth, utilization of available storage, and protection of critical data. Typically, when conducting separate installations of an OS upgrade installation and a tools installation, the installation procedures perform identical tasks. This duplication essentially doubles the duration of those tasks and significantly extends the server build duration.

By integrating the vendor software tool components into the initial OS installation, the automated OS image installer may eliminate duplicate procedures, disk drive conversion, and excess time waiting for redundant disk copies. In one implementation, utilizing the automated OS image installer, disk drives of end server device 130 may be set up in a redundant configuration under the vendor tool software control before the OS installation begins. The automated OS image installer may then cause OS files be installed directly to volumes for the core software, apply a volume table of contents (VTOC) that is consistent with the core software, and initiate a task to mirror core software volumes in parallel with installation of the operating system files. The automated OS image installer process may thus provide a significant reduction in the total server build duration.

FIG. 2 is an exemplary diagram of a device 200 that may correspond to one or more devices in network 100, such as client device 110, software server 120, and/or end server device 130. As illustrated, device 200 may include a bus 210, a processing unit 220, a main memory 230, a read-only memory (ROM) 240, a storage device 250, an input device 260, an output device 270, and/or a communication interface 280. Bus 210 may include a path that permits communication among the components of device 200.

Processing unit 220 may include a processor, a microprocessor, an application-specific integrated circuit (ASIC), a field programmable gate array (FPGA), or another type of processing unit that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, a touch screen, etc. Output device 270 may include a mechanism that outputs information to the operator, such as a display, a speaker, a light emitting diode (LED), etc. Communication interface 380 may include any transceiver-like mechanism that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.) or a combination of wireless and wired communications. For example, communication interface 380 may include mechanisms for communicating with another device or system via a network, such as network 150.

As described herein, device 200 may perform certain operations in response to processing unit 220 executing software instructions contained in a computer-readable medium, such as main memory 230. A computer-readable medium may be defined as a physical or logical memory device. A logical memory device may include memory space within a single physical memory device or spread across multiple physical memory devices. The software instructions may be read into main memory 230 from another computer-readable medium or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer components, different components, differently arranged components, or additional components than depicted in FIG. 2. Alternatively, or additionally, one or more components of device 200 may perform one or more other tasks described as being performed by one or more other components of device 200.

FIG. 3 illustrates a diagram of exemplary functional components of client device 110. In another implementation, one or more the functional components of FIG. 3 may be included within a combination of software server 120 and client device 110. As illustrated, software server 120 may include an interview interface 310, storage 320, and an installation manager 330. The functions described in FIG. 3 may be performed by one or more of the exemplary components of device 200 depicted in FIG. 2.

Interview interface 310 may include hardware or a combination of hardware and software (e.g., processing unit 220) to collect user data relating to the OS installation to be performed on end server device 130. For example, interview interface 310 may prompt a user (e.g., a system administrator) for particular installation parameters, such as information about the user (e.g., identification and/or authorization codes, contact information, etc.), information about the software to be installed (e.g., license keys, versions, etc.), information about the server (e.g., serial numbers, physical location, and commands used to remotely access client device 110), and other system information (e.g., domain name server (DNS) address, network time protocol (NTP) server address, monitoring software, backup schemes, ECC servers, hostname, etc.). In one implementation, interview interface 310 may supply default values (e.g., selected values or most-recently used parameters that may be stored in storage 320) for at least some requested information. Interview interface 310 may include a non-graphical user interface, such as a text-based interface, or a graphical user interface (GUI). Interview interface 310 may receive user responses (e.g., user input) for each prompted installation parameter and store the user input for use during another phase of the customized system installation.

Storage 320 may include hardware or a combination of hardware and software (e.g., processing unit 220 and storage device 250) to store received user input (e.g., user input associated with interview interface 310) and default parameters (e.g., data used as default values in prompts presented by interview interface 310). In implementations described herein, user input stored in storage 320 may by retrieved (e.g., by installation manager 330) and supplied to end server device 130 at appropriate times throughout the OS installation process. Storage 320 may also store a customized network-bootable disk image (referred, e.g., in a Solaris system as a "miniroot") that includes key components of core software packages (e.g., component of the Veritas Foundation Suite). The customized network-bootable disk image may also allow the core software components (e.g., Veritas components) to function when booted and running from the customized network-bootable disk image.

Installation manager 330 may include hardware or a combination of hardware and software (e.g., processing unit 220) to distribute the customized network-bootable disk image and user input to end server device 130. For example, installation manager 330 may provide a customized network-bootable disk image (or "miniroot") to a particular server (end server device 130) that is to be upgraded. The customized network-bootable disk image may enable a WAN boot installation for the OS and may also include particular components of other core software packages that allow the particular components to function when booted and running from the network-bootable disk image. The customized network-bootable disk image may separate the installation process into three separate phases: a pre-installation phase, an OS installation phase, and a post-installation phase. Upon requests from end server device 130 using the customized network-bootable disk image, installation manager 330 may retrieve the user input (e.g., user input associated with interview interface 310 and stored in storage 320) and supply appropriate information to allow the system installation on end server device 130 to progress in an automated manner.

The three phases of the installation process may be considered in the context of a Solaris OS installation with core software from the Veritas Foundation Suite. The installation process may allow integration of and installation directly to an encapsulated, mirrored Veritas Volume Manager-controlled root filesystem for the Solaris Operating System. During the pre-installation phase, volumes for file system management software (e.g., Veritas) may be pre-created on end server device 130 and configured such that the vendor OS installer is able to use the volumes as if they were typical (e.g., non-Veritas) partitions. Pre-creating the volumes for the file management software may contrast with, for example, the regular Veritas procedure of installing a standard OS (e.g., Solaris) partition, and then converting the partition to a Veritas volume after the system is running.

Before the automated OS image installer passes control back to the normally autonomous vendor OS (e.g., Solaris) install process (thus ending the pre-installation phase), a "hook" may be activated to allow the automated OS image installer to regain control during the installation phase. For example, in a Solaris environment, the UNIX "mount" command on a miniroot may be replaced with custom code that allows the automated OS image installer to perform additional tasks at a time when filesystems are just about to be used by the vendor OS installer for the first time. The additional tasks may include the following:

(a) When the vendor OS installer attempts to mount the standard filesystem partitions, the mount command may be intercepted and instead the corresponding Veritas volume that has been previously created may be mounted.

(b) When the first filesystem partition mount is intercepted, the volume table of contents (VTOC) may be restored using a copy that was made during the pre-installation process. The restored copy may be necessary because the vendor OS installer may create a new VTOC that corresponds only to standard vendor (e.g., Solaris) partitions, without any of the special Veritas-related settings.

(c) When a request to mount the last filesystem partition is intercepted, a separate customized network-bootable disk image task may be started that executes in the background to mirror all of the Veritas volumes while the vendor OS installer works to install the operating system files. This parallel processing saves considerable time, since the disk mirroring activity starts immediately and occurs in parallel with other installation processes.

A flash archive (FLAR) that is installed by the vendor OS installer may also be customized for the customized network-bootable disk image, and may contain not only the standard vendor OS packages, but also a full installation of Veritas Foundation Suite, ready for use the first time the system is started, along with other standardized packages for the customized network-bootable disk image.

When the automated OS image installer once again regains control via the standard post-installation process, completion of the Veritas mirroring process may be confirmed. This confirmation may ensure that on the very first boot of the freshly-installed system (e.g., installed on end server device 130) that data redundancy already exists. Additionally, end server device 130 hardware's non-volatile boot settings may be modified to use the mirrored disks as the primary and secondary boot devices.

Although FIG. 3 shows exemplary functional components of software server 120, in other implementations, software server 120 may contain fewer functional components, different functional components, differently arranged functional components, or additional functional components than depicted in FIG. 3. In still other implementations, one or more functional components of software server 120 may perform one or more other tasks described as being performed by one or more other functional components of software server 120.

FIG. 4 illustrates a flow chart of an exemplary process 400 for performing an interview-based automated installation according to an implementation described herein. In one implementation, process 400 may be performed by client device 110. In another implementation, some or all of process 400 may be performed by software server 120 in conjunction with one or more other devices, such as client device 110 and/or end device 130.

Referring to FIG. 4, process 400 may include prompting a user for installation parameters (block 410) and receiving and storing the installation parameters (block 420). For example, as described above in connection with FIG. 3, interview interface 320 may prompt a user (e.g., a system administrator) for particular installation parameters, such as information about the user (e.g., identification and/or authorization codes, contact information, etc.), information about the software to be installed (e.g., license keys, versions, etc.), information about the server (e.g., serial numbers, physical location, and commands used to remotely access the console), and other system information (e.g., DNS address, NTP server address, monitoring software, backup schemes, ECC servers, hostname, etc.). In one implementation, prompts from interview interface 310 may include default values (e.g., selected values or most-recently used parameters that may be stored in storage 320) for at least some requested information. Interview interface 320 may receive user response (e.g., user input) and store the user input for use during another phase of the customized system installation.

Referring back to FIG. 4, process 400 may also include initiating customized system installer at an end server device (block 430), supplying appropriate parameters to the installation packages running on the end server device (block 440), and installing the standard OS image within the file systems of core software (block 450). For example, as described above in connection with FIG. 3, installation manager 330 may provide a customized network-bootable disk image to a particular server (end server device 130) that is to be upgraded. The customized network-bootable disk image (or "miniroot") may enable a WAN boot installation for the OS and may also include particular components of other core software packages that allow the particular components to function when booted and running from the network-bootable disk image. The customized network-bootable disk image may separate the installation process into three separate phases: a pre-installation phase, an OS installation phase, and a post-installation phase. Upon requests from end server device 130 using the customized network-bootable disk image, installation manager 330 may retrieve the user input (e.g., user input associated with interview interface 310 and stored in storage 320) and supply appropriate information to allow the system installation on end server device 130 to progress in an automated manner.

FIG. 5 illustrates a flow chart of an exemplary process 500 for installing OS software with one or more other software packages. Particular examples of blocks in FIG. 5 are described in the context of a Solaris OS being installed in conjunction with certain Veritas components. User interface examples corresponding to particular blocks of process 500 are provided in FIGS. 6A-6H.

Referring to FIG. 5, process 500 may include retrieving installation and boot software for an end server device over a network (block 510). For example, client device 110 may send instructions (as directed by a user) to end server device 130 to initiate a WAN boot. The WAN boot may allow end server device 130 to be loaded from "bare metal" over a network (e.g., network 150). In one implementation, instructions from client device 110 may cause end server device 130 to download (e.g., from software server 120, a web server, or another device) a small customized network-bootable disk image (e.g., a "miniroot"). The customized network-bootable disk image may contain a kernel and a minimal amount of software needed to install, for example, a Solaris environment. The customized network-bootable disk image may be downloaded to a RAM disk on end server device 130, and the installer process may be started (e.g., using the customized network-bootable disk image). FIG. 6A provides a sample screen shot of a user interface 600 for initiating a WAN boot.

A root disk selection may be requested (block 520). For example, end server device 130 may prompt client device 110 to send instructions (as directed by a user) to end server device 130 to select a root disk from an indentified group of disks. FIG. 6B provides a sample user interface screen 610 for providing a root disk selection. After the automated OS image installer is finished loading, the user interface screen 610 may be presented to the user on client device 110. From user interface screen 610, the user (e.g., system administrator)

may select the root disk, and optionally a mirror disk and alternate disks (which are used for weekly OS copies, future OS upgrades, etc.).

Interview questions may be presented to a user (block 530). For example, client device 110 may present questions to a user. Interview questions may include, for example, information about the user (e.g., identification and/or authorization codes), information about the software to be installed (e.g., a license key), information about the server (e.g., serial number, physical location, and commands used to remotely access the console). FIG. 6C provides a sample user interface screen 620 for performing an installation interview. In one implementation, as shown in user interface screen 620, logical default values may be presented for certain questions, such as DNS and NTP configurations, which can be over-ridden if necessary. Also, other parameters about end server device 130 may be gathered (e.g., monitoring status, backup strategy, EMC control center (ECC) server, etc.).

A user may be prompted to select a customization profile (block 540). For example, client device 110 may provide customization options to the user. FIG. 6D provides a sample user interface screen 630 for providing customization options. Customization option may include, for example, OS versions that are based on master images that contain patched versions of essential software packages, such as Solaris, Veritas, and/or other core packages. User interface screen 630 may prompt a user to select what packages/settings will be added after the master image. For example, profiles 1, 2, 3, and 4 are shown in sample user interface screen 630, with profile "3" being selected. After the profile is selected, as shown in FIG. 6D, a list of all settings may be presented for user confirmation before instillation begins.

Joint installation of OS and core software may be initiated (block 550). For example, end server device 130 may begin running installation shells and/or scripts for the software upgrade. From a user standpoint, the installation process starts and continues in a "hands off" manner until end server device 130 reboots and is ready to perform network services. The automated OS image installer may feed parameters to the installation package(s) as required throughout the installation process. FIG. 6E provides a sample user interface screen 640 for the installation process. In one implementation, as shown in FIG. 6E, volumes for file system management (e.g., Veritas) are configured early in the installation process, allowing the OS software image to be installed directly to the managed volumes without any additional reboots or manual encapsulation.

An OS master image may be installed (block 560). For example, end server device 130 may extract a master image archive of the OS software. A large portion of the installation time is transferring and writing the master image archive. Since all of the data needed to build the system can be gathered early on (e.g., via the interview questions of block 530), the user does not need to be present during the mater image extraction to supply additional information. FIG. 6F provides a sample user interface screen 650 for providing a root disk selection.

Perform post-installation customization (block 570). For example, once the master image has been transferred, end server device 130 may apply customizations based on previous user input (e.g., supplied via the customization profile questions of block 540). FIG. 6G provides a sample user interface screen 660 for performing post-installation customization. Customizations, determined by end server device 130 based on the user's profile selection (e.g., profile "3" selected in sample user interface screen 630), may be performed.

A reboot of the end server device may be initiated (block 580). For example, end server device 130 may automatically reboot. Server information entered earlier by the user (physical location, remote console access, and serial number supplied in sample user interface screen 620 of FIG. 6C) may be automatically displayed on each boot for easy reference. FIG. 6H provides a sample user interface screen 670 for a first boot following the OS installation. Once the login prompt appears, end server device 130 may be ready to return to service, with the exception of any packages that could not be installed during the WAN boot, which may be automatically installed at that point.

Referring generally to FIGS. 6A-6H, exemplary user interfaces capable of being generated by client device 110 are depicted. The user interfaces may include a non-graphical user interface, such as a text-based interface shown in FIGS. 6A-6H. In another implementation, a graphical user interface (GUI) may be used. The user interfaces may receive user inputs via one or more input devices (e.g., input device 260) and may be displayed to a user via one or more output devices (e.g., output device 270). Although the user interface of FIGS. 6A-6H depict a variety of information, in other implementations, the user interface may depict more, less, different and/or differently-arranged information than depicted in FIGS. 6A-6H.

Systems and/or methods described herein may provide an operating system installation process that may prompt a user to supply installation parameters for joint installation of an operating system and core software on a server device, and may store, in a memory, the installation parameters received from the user. The computing device may provide, to the server device, instructions to install an image of the operating system directly to volumes for the core software, where the instructions require input of installation parameters during the installation; and may receive, from the server device and during the operating system installation, requests for the installation parameters. The computing device may send, to the server device, the stored installation parameters that are responsive to the requests for the installation parameters.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIGS. 4 and 5, the order of the blocks may be modified in other implementations. Further, non-dependent blocks may be performed in parallel.

It will be apparent that aspects, as described herein, may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware may be designed to implement these aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method, comprising:
prompting, by the computing device, a user of the computing device to supply multiple installation parameters for installation of an operating system and core software on a server device;
receiving, by the computing device, the multiple installation parameters from the user;
storing the multiple installation parameters in a memory associated with the computing device;
providing, by the computing device and to the server device, a network-bootable disk image to initiate a process to install the operating system and the core software on the server device,
the network-bootable disk image including an installer, for the operating system, that requires input of the multiple installation parameters, and
the network-bootable disk image causing the installer to:
replace a mount command on a miniroot with code that allows the installer to perform a task at a time when file systems are to be initially used during an installation process associated with installing the operating system and the core software on the server device;
intercept a mount command for mounting a standard file system partition,
cause volumes for the core software to be mounted instead of the standard file system partition based on intercepting the mount command,
install files for the operating system directly to the volumes for the core software,
mirror, in parallel with installing the files for the operating system, the volumes for the core software, and
modify a non-volatile boot setting of the server device to cause the mirrored volumes to be used as a primary boot device and a secondary boot device by the server device;
receiving, by the computing device and during the process, a request for a particular one of the multiple installation parameters from the server device; and
supplying, by the computing device and to the server device, the particular one of the multiple installation parameters based on the stored installation parameters.

2. The computing-device implemented method of claim 1, where supplying the particular one of the multiple installation parameters includes:
retrieving, by the computing device, the particular one of the multiple installation parameters from the stored installation parameters.

3. The computing-device implemented method of claim 1, where the network-bootable disk image also includes an installer for particular components of the core software.

4. The computing device-implemented method of claim 3, where the operating system is a UNIX operating system and the particular components of the core software include file system management components.

5. The computing device-implemented method of claim 1, where the multiple installation parameters prompted by the computing device include one or more of:
information about the user,
information about the operating system and the core software to be installed, or
information about the server device.

6. The computing device-implemented method of claim 5, where the information about the server device includes one or more of:
a serial number of the server device,
a physical location of the server device,
a command used to remotely access the computing device,
a domain name server (DNS) address, or
a network time protocol (NTP) server address.

7. The computing device-implemented method of claim 1, where prompting the user includes:
retrieving device information from the server device, and
providing, to the user, default values for one or more of the multiple installation parameters based on the device information.

8. The computing device-implemented method of claim 1, where prompting the user includes:
providing, to the user, a list of multiple customization profiles for installation of the operating system, and
where the method further comprises:
applying post-installation customization of the operating system based on a selection of one of the multiple customization profiles by the user.

9. The computing device-implemented method of claim 1, further comprising:
causing an image of the operating system to be installed on the server device,
where the image of the operating system is installed directly to volumes for file system management software.

10. A computing device, comprising:
a processor to:
receive, from a client device, a network-bootable disk image to install an operating system and core software on the computing device; and
install, based on the network-bootable disk image, the operating system and the core software on the computing device,
the processor, when installing the operating system and the core software, being to:
receive, from the client device, installation parameters to install the operating system and the core software on the computing device,
the client device prompting a user of the client device to supply the installation parameters to install the operating system and the core software on the computing device, and
the client device storing, in a memory, the installation parameters received from the user prior to sending the network-bootable disk image to the computing device,
replace a mount command on a miniroot with code that causes a task to be performed at a time when file systems are to be initially used during an installation process associated with installing the operating system and the core software on the computing device;
intercept a mount command for mounting a standard file system partition,
cause volumes for the core software to be mounted instead of the standard file system partition based on intercepting the mount command,
install files for the operating system directly to the volumes for the core software,
mirror, in parallel with installing the files for the operating system, the volumes for the core software, and modify a non-volatile boot setting of the computing device to cause the mirrored volumes to be used as a primary boot device and a secondary boot device by the computing device.

11. The computing device of claim 10, where, when installing the files for the operating system, the processor is further to:
   determine that an installer, associated with the operating system, is attempting to mount file system partitions, and
   cause the volumes for the core software to be mounted instead of the file system partitions.

12. The computing device of claim 10, where the core software includes file system management software, and
   where, when installing the files for the operating system, the processor is further to:
      install an image of the operating system directly to volumes for the file system management software.

13. The computing device of claim 10, where the network-bootable disk image includes an installer to install particular components of the core software.

14. The computing device of claim 13, where the operating system is a UNIX operating system and the particular components of the core software include file system management components.

15. The computing device of claim 10, where the installation parameters include one or more of:
   information about the user,
   information about the operating system and the core software to be installed, or
   information about the computing device.

16. The computing device of claim 10, where the processor is further to:
   provide device information to the client device,
      the client device supplying the device information as default values for one or more of the installation parameters when prompting the user to supply the installation parameters.

17. The computing device of claim 10, where, when installing the operating system and the core software, the processor is further to:
   create and configure the volumes for the core software to enable the operating system to be installed using the volumes for the core software.

18. The computing device of claim 10, where the processor is further to:
   set up disk drives of the computing device in a redundant configuration prior to installing the operating system and the core software, and
   create the volumes for the core software based on setting up the disk drives in the redundant configuration.

19. A system comprising:
   means for prompting a user of a computing device to supply installation parameters for installation of an operating system and core software on a server device;
   means for receiving the installation parameters from the user;
   means for storing the installation parameters in a memory;
   means for providing to the server device instructions for jointly installing the operating system and the core software,
      the instructions requiring sequential input, from an entity other than the server device, of multiple parameters, and
      the instructions causing the server device to:
         replace a mount command on a miniroot with code for causing a task to be performed at a time when file systems are to be initially used during an installation process associated with installing the operating system and the core software on the server device,
         intercept a mount command for mounting a standard file system partition,
         cause volumes for the core software to be mounted instead of the standard file system partition based on intercepting the mount command for mounting the standard file system partition,
         install files for the operating system directly to the volumes for the core software,
         mirror, in parallel with installing the files for the operating system, the volumes for the core software, and
         modify a non-volatile boot setting of the server device to cause the mirrored volumes to be used as a primary boot device and a secondary boot device;
   means for receiving, from the server device, a request for a particular one of the multiple parameters; and
   means for supplying, to the server device, the particular one of the multiple parameters based on the stored installation parameters.

20. The system of claim 19, where the instructions further require the server device to install an image of the operating system directly to the volumes for the core software.

21. A non-transitory computer-readable medium storing instructions, the instructions comprising:
   one or more instructions that, when executed by a processor of a server device, cause the processor to:
      receive a network-bootable disk image to install an operating system and core software on the server device, the network-bootable disk image including an installer, for the operating system;
      replace a mount command on a miniroot with code that allows the installer to perform a task at a time when file systems are to be initially used during an installation process associated with installing the operating system and the core software on the server device;
      intercept a mount command for mounting a standard file system partition;
      cause volumes for the core software to be mounted instead of the standard file system partition based on intercepting the mount command for mounting the standard file system partition;
      install, based on the network-bootable disk image, an image of the operating system directly to the volumes for the core software;
      mirror, in parallel with installing the image of the operating system, the volumes for the core software, and
      modify a non-volatile boot setting of the server device to cause the mirrored volumes to be used as a primary boot device and a secondary boot device by the server device.

22. The non-transitory computer-readable medium of claim 21, where the code that allows the installer to perform the task causes a mount command on a miniroot to be replaced with code that allows the installer to restore a volume table of contents at the time when the file systems are to be initially used during the installation process associated with installing the operating system and the core software on the software device,
   where the volume table of contents is restored using a copy of the volume table of contents that was created during a pre-installation process associated with installing the operating system and the core software on the server device.

23. The non-transitory computer-readable medium of claim 21, where the instructions further comprise:
one or more instructions that, when executed by the processor, cause the processor to:
initiate, based on the network-bootable disk image, a vendor install process to install the operating system, and
interrupt the vendor install process to perform additional tasks.

24. The non-transitory computer-readable medium of claim 23, where the one or more instructions to interrupt the vendor install process to perform the additional tasks include:
one or more instructions that, when executed by the processor, cause the processor to:
restore the volume table of contents using a copy that was made during a pre-installation process.

* * * * *